Patented Aug. 20, 1946

2,406,086

UNITED STATES PATENT OFFICE 2,406,086

ALKYLATION OF ISOPARAFFINIC HYDROCARBONS

Carl B. Linn, Riverside, Ill., assignor to Universal Oil Products Company, Chicago, Ill., a corporation of Delaware No Drawing. Application September 16, 1943, Serial No. 502,664

7 Claims. (Cl. 260—683.4)

This application is a continuation-in-part of my co-pending application Serial No. 424,784, filed December 29, 1941.

This invention relates to the treatment of isoparaffinic hydrocarbons, both gaseous and liquid, to produce therefrom branched chain paraffinic hydrocarbons of higher molecular weight. In a more specific sense this invention is concerned with a novel process for alkylating isoparaffinic hydrocarbons, comprising isobutane and relatively low-boiling normally liquid isoparaffins with normally gaseous or liquid olefins to produce normally liquid saturated hydrocarbons which may be utilized as components of gasoline suitable for use in airplane and automobile engines.

These isoparaffinic and olefinic hydrocarbons have been utilized in alkylation reactions in the presence of hydrogen fluoride alone or of hydrogen fluoride diluted by relatively small quantities of water. The present type of catalyst is a marked improvement over previous catalysts containing hydrogen fluoride in that the activity of the catalytic material may be controlled more accurately by proper dilution with a substance which is relatively inert catalytically but which has substantial solubility in liquid hydrogen fluoride.

In one specific embodiment the present invention comprises a process for synthesizing substantially saturated hydrocarbons of gasoline boiling range by alkylating isoparaffinic hydrocarbons with olefinic hydrocarbons in the presence of a catalyst comprising essentially a major proportion of a liquid hydrogen fluoride and a relatively minor proportion of hydrogen cyanide.

By the addition of hydrogen cyanide to substantially anhydrous hydrogen fluoride, the ordinarily vigorous reaction of hydrogen fluoride on catalytic condensation reactions among hydrocarbons is moderated to the extent that reactions of alkylation occur in preference to other less desirable reactions. Alkylation is essentially a complex reaction since the simple union of isoparaffinic and olefinic molecules to give the so-called primary reaction product is accompanied by many side reactions, among which are decomposition or cracking reactions and isomerization, which can, under certain conditions, change a substantial proportion of the primary product such as iso-octanes into a mixture of lower and higher boiling hydrocarbons frequently of lower antiknock value. Accordingly, the present invention deals with the modification of hydrogen fluoride alkylation catalyst by the addition thereto of a particular non-oxidizing acid which moderates the action of hydrogen fluoride and modifies the reactions involved in such a way as to improve the yield and quality of the hydrocarbon alkylation product.

The term isoparaffin is herein used broadly to include all alkylatable branched chain paraffinic hydrocarbons. The reactions of the present process are effected under controlled conditions of temperature and pressure until the olefins have been substantially consumed and a substantially saturated hydrocarbon product is formed which boils within the boiling range of gasoline.

Hydrogen cyanide is a weak volatile acid and like hydrogen fluoride it is a liquid at ordinary temperatures and atmospheric or slightly super-atmospheric pressures. Hydrogen cyanide has a boiling point of 26.5° C. and hydrogen fluoride boils at 19.4° C. The melting points of hydrogen cyanide and hydrogen fluoride are —13.4° C. and —92.3° C., respectively. Hydrogen cyanide is soluble in water, alcohol, and ether, and also in hydrogen fluoride in the concentrations which are contemplated in the present process. Ordinarily the catalyst employed in my invention may comprise from about 0.5 to about 10% by weight of hydrogen cyanide although larger quantities may be used in certain cases. Because of its toxicity and attendant difficulties when employed in high concentrations it is generally desirable to maintain the hydrogen cyanide content of the catalyst below about 5% by weight.

Isobutane is the isoparaffin commonly subjected to alkylation although higher molecular weight isoparaffins also react with olefins under similar or modified conditions of operation to produce branched chain paraffins of higher boiling point than the isoparaffins charged to the process. However, as the higher molecular weight isoparaffins such as isopentane, isohexane, etc. are themselves valuable constituents of gasoline, they are consequently used less commonly as charging stocks for the alkylation process than is isobutane. Mono-olefins and particularly those containing from 3 to about 16 carbon atoms per molecule are utilizable for alkylating isoparaffins in the presence of hydrogen fluoride and a diluent or spacing agent, although the common olefin-containing charging stocks are often limited to hydrocarbon fractions containing ethylene, propene, and butenes. Normal paraffins frequently present in hydrocarbon fractions containing propene and butenes dilute the reacting hydrocarbons but are separable from the alkylation products by distillation. Thus propane and normal butane may be removed from the alkylation product while an isoparaffin such as isobutane, which is also separated from the reaction product, is recycled to further alkylation treatment.

In order to favor the alkylation reaction rather than olefin polymerization, the hydrocarbon charging stock including the isoparaffin and added olefin-containing fraction may be commingled with recycled isoparaffin so that the ratio of isoparaffin to olefin in the total hydrocarbon mixture charged to the alkylation zone is approximately 5:1. In some cases this ratio may be as low as about 2:1 or as high as 10:1, or more, the exact ratio being somewhat dependent upon the particular isoparaffin and olefin or olefin-containing mixture charged.

Alkylation reaction temperatures between about 0° and about 50° C. are preferred, although satisfactory results may be obtained at temperatures as low as about −30° and as high as about +100° C. when reacting isoparaffins with olefins in the presence of a mixture of hydrogen fluoride and a diluent or spacing agent as herein described. As additional means of regulation of the upper limits of temperature, the proportions of hydrogen fluoride and diluent may be varied to produce good results provided they are co-ordinated properly with the reaction temperature and rate of charge of the isoparaffin and olefin hydrocarbons. For instance, the reaction of isobutane with propene may require more severe conditions such as a somewhat higher temperature or a catalyst containing a higher proportion of hydrogen fluoride to diluent than that used for catalyzing the reaction of isobutane with the more reactive isobutene. Superatmospheric pressure, generally not in excess of about 20 atmospheres, is employed to assist the reaction and to prevent undue loss of the reactants and catalyst by vaporization and, when desirable, to maintain the hydrocarbons and catalyst in substantially liquid state or to effect liquefaction of a portion of the reaction mixture.

While in most cases the activity of the alkylating composite employed is due principally to the hydrogen fluoride, it is recognized that the hydrogen cyanide added thereto may at times exert a definite chemical influence upon the reactions other than merely moderating the effect of the hydrogen fluoride. It is also evident that the selection of any particular diluent or mixture of diluents for use with hydrogen fluoride is determined largely by solubility relations, the ease of alkylating the isoparaffinic hydrocarbons involved, the general operating conditions, and the matter of economy in the cost of the reagents.

The process of the present invention is carried out in either batch or continuous types of operation. In a simple batch type process, an isoparaffin to be alkylated such as isobutane, is brought to the alkylating temperature within the approximate range specified and in the presence of the necessary amount of catalyst mixture and alkylation is effected by the gradual introduction of an olefin, or preferably of an olefin-isoparaffin mixture, under the surface of the liquid which is stirred mechanically to effect intimate contact between the catalyst and the reacting hydrocarbons and to prevent settling of the catalyst which is heavier than the liquid hydrocarbon mixture. Alkylation may be allowed to progress to different stages of reaction. In the case of the alkylation of isobutane by propene or butenes, good products from the standpoint of high antiknock gasoline are produced usually by maintaining at all times in the reaction zone a molar excess of isoparaffin to olefin. The presence of such an excess of isoparaffins, generally at least 2 molecular proportions of isoparaffin per molecular proportion of olefin, tends to minimize undesirable polymerization reactions. The mixture of alkylation products and catalyst composite is removed periodically from the batch type process and separated into a hydrocarbon layer and a catalyst layer, the latter being returned to the reaction zone for further use while the hydrocarbon layer is fractionally distilled to separate therefrom the gasoline fraction and the excess of the isoparaffin originally charged to the process. The excess isoparaffin may be reacted further with an olefin in a subsequent alkylation treatment in the alkylation zone of the process.

It is usually preferable to carry out the alkylation reaction on a continuous basis by withdrawing from the alkylation reactor a mixture of excess unreacted isoparaffins and admixed normal paraffins, an alkylate of gasoline boiling range, higher boiling hydrocarbons, and catalyst composite, said mixture being withdrawn at substantially the same rate as that at which the fresh and recycled hydrocarbon charging stock and mixture of fresh and recycled catalyst are supplied to the alkylation reactor. In order to keep low the competing olefin polymerization reaction, the molar ratio of isoparaffins to olefins in the alkylating zone is kept high throughout the entire reaction. The ratio of isoparaffin to olefin is subject to some variation and is affected considerably by the method of introducing the olefin-containing fraction and by the efficiency of mixing. As the process is usually operated, sufficient pressure is maintained upon the reaction mixture to keep a substantial proportion thereof in liquid state. The exact pressure necessary depends both upon the composition of the reaction mixture and the temperature employed. The alkylation reactor used in the process consists quite often of a coil or tower provided with baffles, orifice plates, or other mixing devices, or a vessel provided with a stirrer or other mechanical means of agitation although any method may be employed which satisfactorily effects intimate contact of the reacting hydrocarbons and mixture of catalyst and spacing agent employed.

The following example is given to indicate results obtainable by the use of the present process, although it is not intended to limit the scope of the invention in exact correspondence with the example.

A mixture of 143 grams of substantially anhydrous hydrogen fluoride and 7 grams of hydrogen cyanide is placed in an autoclave of approximately 2000 cc. capacity equipped with a pressure-sealed stirring device. The autoclave is maintained at approximately 50° C. while 1000 cc. of a liquid mixture containing 2 molecular proportions of isobutane and 1 molecular proportion of normal butene is introduced continuously to the autoclave over a period of 1.5 hours after which the stirring is continued for an additional time of 0.5 hour.

The resultant mixture of reaction products is separated into a hydrocarbon layer and a heavier catalyst layer. The used catalyst is returned to the autoclave for use in another alkylation run while the hydrocarbon layer is fractionally distilled to separate from higher boiling alkylation products the unreacted isobutane and small amounts of hydrogen fluoride which generally dissolve in the hydrocarbon layer. The recovered isobutane is used in another alkylation run while the higher boiling hydrocarbons are washed with water and caustic soda solution, then dried and distilled to separate therefrom a substantially saturated fraction of gasoline boiling range containing a high proportion of branched chain octanes.

From 1000 cc. of the isobutane-normal butene mixture there is obtained approximately 370 grams of normally liquid paraffinic hydrocarbons containing 90% by volume of 300° F. end point aviation gasoline with an A. S. T. M. octane number of 92.5.

I claim as my invention:

1. An alkylation process which comprises reacting an isoparaffin with an olefin in the presence of a liquid hydrogen fluoride catalyst to which has been added a minor proportion of hydrogen cyanide.

2. A process for synthesizing substantially saturated hydrocarbons of gasoline boiling range which comprises alkylating an isoparaffinic hydrocarbon with an olefinic hydrocarbon in the presence of a catalyst consisting of a major proportion of liquid hydrogen fluoride and a minor proportion of hydrogen cyanide.

3. The process of claim 1 wherein said hydrogen cyanide comprises from about 0.5 to about 10% by weight of the catalyst.

4. An alkylation process which comprises contacting an isoparaffinic hydrocarbon with an olefinic hydrocarbon at a temperature of from about $-30°$ C. to about 100° C. in the presence of a catalyst comprising essentially a major proportion of liquid hydrogen fluoride and a relatively minor proportion of hydrogen cyanide.

5. An alkylation process which comprises contacting an isoparaffinic hydrocarbon with an olefinic hydrocarbon in the presence of a catalyst comprising essentially a major proportion of liquid hydrogen fluoride and a relatively minor proportion of hydrogen cyanide at a temperature of from about $-30°$ C. to about 100° C. and under sufficient pressure to maintain a substantial proportion of the reacting hydrocarbons and catalyst in the liquid state.

6. An alkylation process which comprises contacting a molar excess of an isoparaffinic hydrocarbon with an olefinic hydrocarbon in the presence of a catalyst comprising essentially a major proportion of liquid hydrogen fluoride and a relatively minor proportion of hydrogen cyanide at a temperature of from about $-30°$ C. to about 100° C. and under sufficient pressure to maintain a substantial portion of the reacting hydrocarbons and catalyst in the liquid phase.

7. An alkylation process which comprises reacting isobutane with a mono-olefin in the presence of a liquid hydrogen fluoride catalyst containing a minor proportion of hydrogen cyanide.

CARL B. LINN.